United States Patent
Suzuki (10) Patent No.: US 10,175,139 B2
(45) Date of Patent: Jan. 8, 2019

(54) SENSOR INFORMATION COLLECTING APPARATUS

(71) Applicant: MINEBEA CO., LTD., Kitasaku-Gun, Nagano (JP)

(72) Inventor: Shinichi Suzuki, Hamamatsu (JP)

(73) Assignee: Minebea Co., Ltd., Nagano (JP)

( * ) Notice: Subject to any disclaimer, the term of this patent is extended or adjusted under 35 U.S.C. 154(b) by 241 days.

(21) Appl. No.: 15/415,268

(22) Filed: Jan. 25, 2017

(65) Prior Publication Data

US 2017/0212004 A1 Jul. 27, 2017

(30) Foreign Application Priority Data

Jan. 27, 2016 (JP) .................................. 2016-013586

(51) Int. Cl.
*G01M 5/00* (2006.01)
*G08B 25/08* (2006.01)
(Continued)

(52) U.S. Cl.
CPC ........ *G01M 5/0041* (2013.01); *G01M 5/0058* (2013.01); *G01M 5/0091* (2013.01);
(Continued)

(58) Field of Classification Search
None
See application file for complete search history.

(56) References Cited

U.S. PATENT DOCUMENTS

| | | | |
|---|---|---|---|
| 2009/0063055 A1* | 3/2009 | Schneider | E21B 21/08 702/9 |
| 2011/0248846 A1* | 10/2011 | Belov | H04Q 9/00 340/539.1 |
| 2013/0002481 A1* | 1/2013 | Solomon | B60R 25/1018 342/357.25 |

(Continued)

FOREIGN PATENT DOCUMENTS

JP  2008-234361 A  10/2008

OTHER PUBLICATIONS

Ghosh et al., "Power Efficient Event Detection Scheme in Wireless Sensor Networks for Railway Bridge Health Monitoring System" IEEE ANTS 2014 (Year: 2014).*

(Continued)

*Primary Examiner* — John C Kuan
(74) *Attorney, Agent, or Firm* — Carrier Blackman & Associates, P.C.; Joseph P. Carrier; William D. Blackman (57) ABSTRACT

A sensor information collecting apparatus includes: a sensor module including a sensor; a sensor amplifier; an acceleration sensor; a control unit; a power supply unit; an illumination unit; an illumination driver; and a battery, which supplies a battery voltage to the acceleration sensor, the control unit, and the power supply unit, wherein, when an acceleration level is equal to or more than a threshold value for data-storing, the control unit activates the sensor amplifier and controls the memory to store the detection data, and wherein, when the acceleration sensor detects an acceleration level which is less than the threshold value for data-storing and is equal to or more than a threshold value for data-transmitting, the control unit outputs an optical communication signal and the illumination driver controls the illumination unit to emit light, on which the optical communication signal is superimposed.

6 Claims, 5 Drawing Sheets

(51) Int. Cl.
*G01P 15/08* (2006.01)
*G08C 17/02* (2006.01)
*G01P 15/00* (2006.01)
*G08B 5/36* (2006.01)
*G06F 1/32* (2006.01)
*H04B 10/50* (2013.01)
*H04B 10/564* (2013.01)

(52) U.S. Cl.
CPC ........ *G01P 15/001* (2013.01); *G01P 15/0891* (2013.01); *G08B 5/36* (2013.01); *G08B 25/08* (2013.01); *G08C 17/02* (2013.01); *G06F 1/32* (2013.01); *G06F 1/3203* (2013.01); *G06F 1/3206* (2013.01); *H04B 10/50* (2013.01); *H04B 10/502* (2013.01); *H04B 10/564* (2013.01); *H04Q 2209/823* (2013.01); *H04Q 2209/883* (2013.01)

(56) References Cited

U.S. PATENT DOCUMENTS

| | | | |
|---|---|---|---|
| 2013/0216237 A1* | 8/2013 | Yamagata | H04B 10/50 398/192 |
| 2013/0218482 A1* | 8/2013 | Chou | H04Q 9/00 702/32 |
| 2016/0018382 A1* | 1/2016 | Worden | G01N 33/2888 73/53.05 |
| 2016/0165323 A1* | 6/2016 | Hollis | H04Q 9/00 340/870.16 |

OTHER PUBLICATIONS

Torfs et al., "Low Power Wireless Sensor Network for Building Monitoring" IEEE Sensors Journal, vol. 13, No. 3, Mar. 2013 (Year: 2013).*

\* cited by examiner

SENSOR INFORMATION COLLECTING APPARATUS

CROSS-REFERENCE TO RELATED APPLICATION

This application claims priority from Japanese Patent Application No. 2016-013586 filed on Jan. 27, 2016, the entire subject matter of which is incorporated herein by reference.

TECHNICAL FIELD

This disclosure relates to a sensor information collecting apparatus, and more particularly, to a sensor information collecting apparatus that operates using a battery.

BACKGROUND

In a sensor information collecting apparatus that measures fatigue deterioration of an infrastructure and accumulates data with a maintenance-free for 10 years by using a battery as a voltage source, a wired system and a wireless system are considered as means that reads data of fatigue deterioration information accumulated regularly (for example, every several years).

In the wired system, it is necessary to disassemble an apparatus having been subjected to dustproof and waterproof processing to extract data. Therefore, since the wired system deviates from the original concept of a maintenance-free apparatus, work is complicated and it would not be realistic.

Meanwhile, in the wireless system, in order to communicate with a wireless module installed in an apparatus, the wireless module is always controlled to be in a standby state and receives a read request signal of accumulated data, so that the accumulated data is controlled to be transmitted from the wireless module for the purpose of reading. In this way, the wireless module is always in the standby state, resulting in a problem that power consumption of a battery is large and thus the lifetime of the battery, which has been made maintenance free for 10 years, is shortened.

On the other hand, there has been disclosed a strain measuring system that reduces the consumption of a power supply unit (for example, see JP-A-2008-234361).

Paragraph 0011 of JP-A-2008-234361 discloses as the effect that "in a master unit remote from a slave unit installed in a measuring place of a measuring site, since a physical quantity generated in the measuring place of the site can be precisely grasped and a physical quantity in a place including a strain gage type sensor is measured in response to the size of the physical quantity transmitted from the slave unit previous time at a time interval determined by the master unit and is transmitted to the master unit from the slave unit, a measurement time interval is reasonably changed in response to the size of the physical quantity in the measuring site, so that it is possible to provide a strain measuring system capable of reasonably performing the reduction of the consumption of the power supply unit and the precise acquirement of accumulated data".

SUMMARY

In the case of using a wireless module such as the slave unit disclosed in JP-A-2008-234361, a circuit is complicated and thus becomes expensive due to mounting a microcomputer for wireless control to the wireless module itself. Thus, in order to transmit measurement data collected by a sensor information collecting apparatus to an exterior, means capable of achieving device simplification and cost reduction as compared with the wireless module is required.

This disclosure is to provide a sensor information collecting apparatus which has a simple configuration and can independently suppress power consumption of a battery.

A sensor information collecting apparatus includes: a sensor module including a sensor; a sensor amplifier, which is in an operation stop state in an ordinary state, is activated in response to receiving a power supply voltage, and outputs detection data detected by the sensor as sensor information; an acceleration sensor, which detects an acceleration level being equal to or more than a predetermined threshold value; a control unit, which manages the detection data in a memory; a power supply unit, which is in the operation stop state in the ordinary state and supplies the power supply voltage to the sensor amplifier in response to an instruction from the control unit; an illumination unit, which is able to emit light with superimposing an optical communication signal; an illumination driver, which is in the operation stop state in the ordinary state and controls the illumination unit; and a battery, which supplies a battery voltage to the acceleration sensor, the control unit, and the power supply unit, wherein, when the acceleration sensor detects an acceleration level being equal to or more than a threshold value for data-storing set as a predetermined threshold value, the control unit activates the sensor amplifier and controls the memory to store the detection data outputted from the sensor amplifier, and wherein, when the acceleration sensor detects an acceleration level which is less than the threshold value for data-storing and is equal to or more than a threshold value for data-transmitting, which is smaller than the threshold value for data-storing, set as a predetermined threshold value, the control unit activates the illumination driver, reads the detection data stored in the memory, and outputs the optical communication signal indicating the detection data to the illumination driver, so that the illumination driver controls the illumination unit to emit light, on which the optical communication signal is superimposed.

Other units will be described in an embodiment of the invention.

According to this disclosure, it is possible to provide a sensor information collecting apparatus which has a simple configuration and can independently suppress power consumption of a battery.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Next, an embodiment for embodying this disclosure (hereinafter, referred to as a "present embodiment") will be described in detail with reference to each of drawings.

Figure 1:
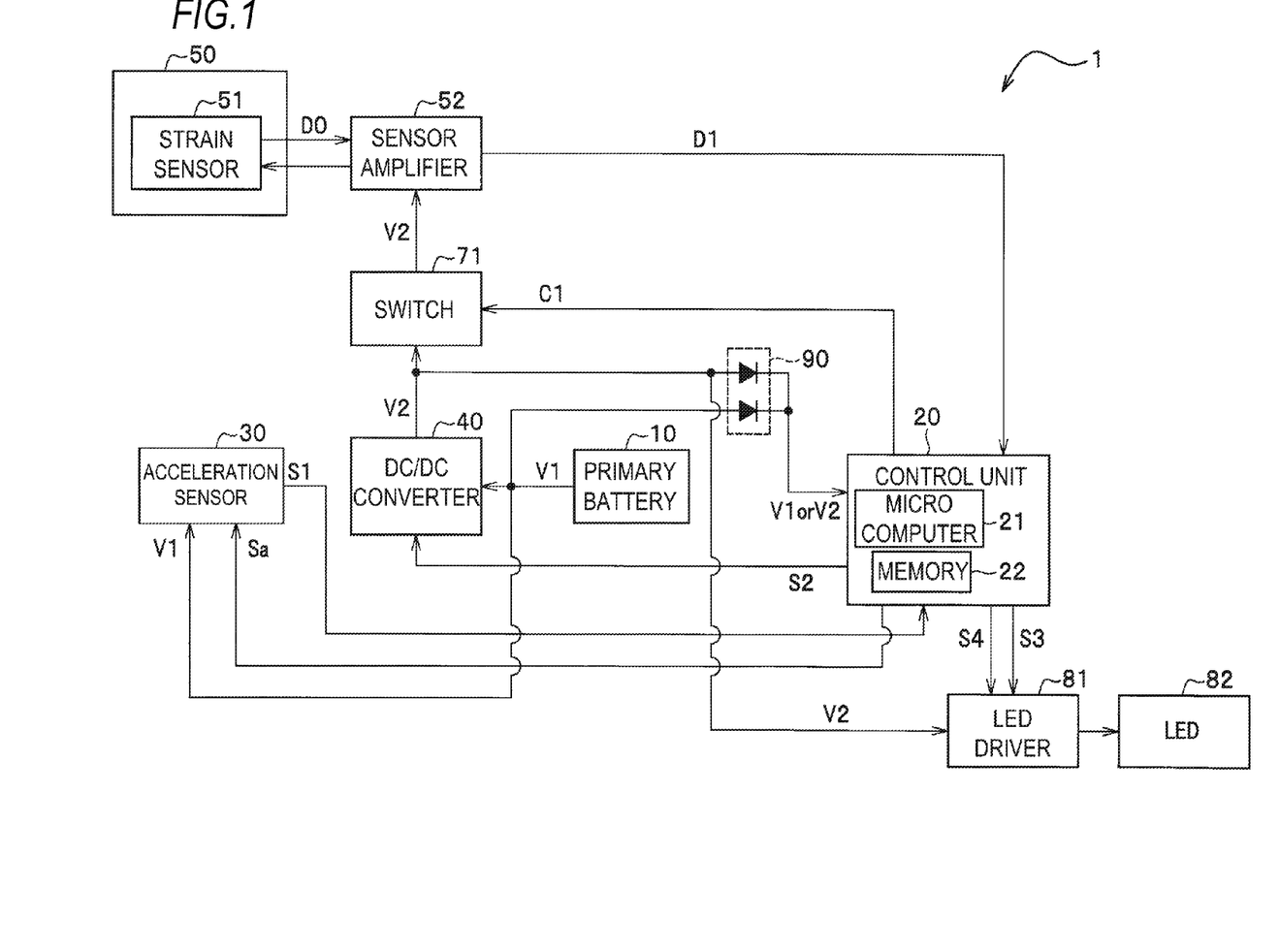
FIG. 1 is a functional block diagram illustrating the configuration of a sensor information collecting apparatus according to an embodiment.

FIG. 1 is a functional block diagram illustrating the configuration of a sensor information collecting apparatus 1 according to the present embodiment.

As illustrated in FIG. 1, the sensor information collecting apparatus 1 according to the present embodiment includes a primary battery 10, a control unit 20 having a microcomputer 21 and a memory an acceleration sensor 30, a DC/DC converter 40, a strain sensor module 50, a sensor amplifier 52, an OR circuit 90, and a switch 71. Furthermore, the sensor information collecting apparatus 1 of the present embodiment includes an LED (Light Emitting Diode) driver (an example of an illumination driver) 81 and an LED (an example of an illumination unit) 82.

The sensor information collecting apparatus 1, for example, is an apparatus that operates in a maintenance-free state for 10 years by employing the primary battery (an example of a battery) 10 as a voltage source, and collects sensor information. In an ordinary state, in order to reduce power consumption of the primary battery 10, the sensor information collecting apparatus 1 controls only the control unit 20 (including the microcomputer 21 and the memory 22) to be in a sleep state and controls the acceleration sensor 30 to enter a wake-up mode. The wake-up mode is a mode in which, when vibration equal to or more than a predetermined value or collision equal to or more than a predetermined value has been detected, setting for outputting information (a "first activation signal" to be described later) indicating the detection is represented and acceleration data is not measured. The sensor information collecting apparatus 1 controls the other elements (the DC/DC converter (an example of a power supply unit) 40, the strain sensor module (an example of a sensor module) 50, the sensor amplifier 52, the LED driver 81 and the like, which will be described later) to be in an operation stop state.

As described above, in the ordinary state, the sensor information collecting apparatus 1 according to the present embodiment controls only the control unit 20 to be in the sleep state in order to reduce the power consumption of the primary battery 10. When the acceleration sensor 30 has detected vibration (acceleration) equal to or more than a predetermined value inclusive of earthquake and at a time interval (when an interrupt signal based on a real-time clock has been generated) set in advance, the sensor information collecting apparatus 1 activates a component circuit and collects sensor information.

The sensor information collecting apparatus 1, for example, is constantly installed in an infrastructure such as an iron bridge, a tunnel, and a jet fan installed in the tunnel and detects looseness of bolts and fatigue deterioration of the structure by using a strain sensor (a strain sensor module), which will be described in the following embodiment. However, sensor information detected by the sensor module is not limited thereto, and it is sufficient if it is sensor information for detecting fatigue deterioration of a structure for a long time (several years) by using an ultrasonic sensor, an acoustic sensor, a vibration sensor, a load sensor, a radiation sensor and the like.

Figure 2:
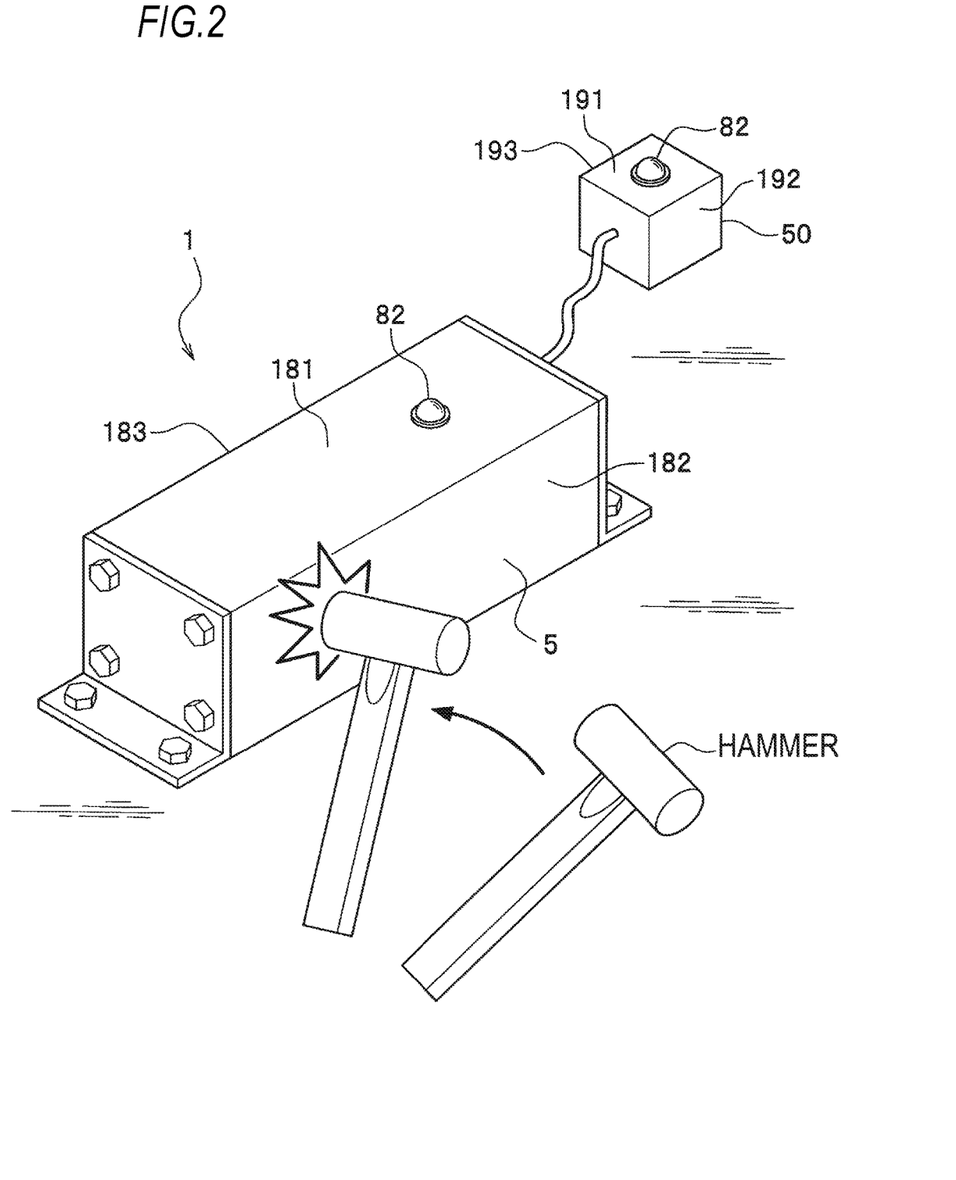
FIG. 2 is a perspective view illustrating an example of the sensor information collecting apparatus according to the embodiment.

FIG. 2 is a perspective view illustrating an example of the sensor information collecting apparatus 1 according to the present embodiment.

As illustrated in FIG. 2, the sensor information collecting apparatus 1 is configured by connecting the strain sensor module 50 to a casing 5. The casing 5 stores the aforementioned primary battery 10, control unit 20, acceleration sensor 30, LED driver 81 and the like therein.

In the related art, a hammering test is performed in order to confirm fatigue deterioration of an infrastructure and the like, and a behavior of "hitting" (collision from an exterior) the structure is general in the test site. In this disclosure, in view of this, in order to read (collect) detection data (sensor information) obtained by measuring the fatigue deterioration of the structure in the sensor information collecting apparatus 1, the casing 5 of the sensor information collecting apparatus 1, for example, is "hit" by a hammer and the like as illustrated in FIG. 2, so that the sensor information collecting apparatus 1 is activated in addition to collision from an exterior and the accumulated data (the sensor information) is controlled to be transmitted for the purpose of reading. The acceleration sensor 30 waits in the wake-up mode (not in an operation mode). When the casing 5 is hit by a hammer and the like, the acceleration sensor 30 detects collision equal to or more than a predetermined value and outputs a activation signal (the first activation signal) to the control unit 20.

An example of a unit for transmitting data to an exterior may include visible light communication based on illumination light of the LED (an example of an illumination unit) 82 controlled by the LED driver 81. The unit is not limited to the visible light communication, and an arbitrary optical communication unit may be used, and the illumination unit is not limited to the LED 82 and may use an arbitrary unit such as an infrared (IR) illumination module. Details of the mounted amount of the LED 82, a light emitting color and the like are not limited to FIG. 2 and the like.

In this way, the sensor information collecting apparatus 1 according to the present embodiment can be installed in a place with no power supply infrastructure and reduces the power consumption of the primary battery 10, so that it is possible to prevent the lifetime of the primary battery 10 from being impaired. Furthermore, extraction of data accumulated in the sensor information collecting apparatus 1 can be simply performed by optical communication.

The LED 82 is attached to at least one of the sensor information collecting apparatus 1 and the strain sensor module 50, although the LED is attached both of which in FIG. 2. For example, in FIG. 2, since the sensor information collecting apparatus 1 and the strain sensor module 50 are respectively installed on a ceiling, downward surfaces 181 and 191 are downwardly directed from the ceiling (the LED 82 illuminates lighting to the ground), respectively. In this case, the LED 82 may be installed on the downward surfaces 181 and 191, or may be installed on right side surfaces 182 and 192 or left side surfaces 183 and 193.

<Description of Operations of Elements of Sensor Information Collecting Apparatus>

Next, the operations of the elements of the sensor information collecting apparatus 1 according to the present embodiment will be described in detail with reference to FIG. 1.

A battery voltage V1 of the primary battery 10 is supplied to the control unit 20 and the acceleration sensor 30 in an ordinary state, and a power supply voltage V2 is supplied to the elements (the control unit 20, the sensor amplifier 52, the LED driver 81 and the like) via the DC/DC converter 40 at the time of detection of sensor information, and the like.

Hereinafter, two types of acceleration levels to be detected by the acceleration sensor 30 are defined.

First, a first acceleration level is called a first threshold value (a threshold value for data-transmitting) to be compared with an acceleration sensor value in a state where the acceleration is zero. The first acceleration level is set as acceleration of a level having no influence on the fatigue deterioration of a structure, for example, 5 mGal. In this way, it is distinguished from earthquake with a seismic intensity of lower 5 or more having an influence on the fatigue deterioration of the structure and for example, the sensor information collecting apparatus 1 is subjected to "hitting" by a hammer, "shaking by hands" and the like, so that the control unit 20 is activated and previously measured and accumulated measurement data of a strain sensor 51 can be transmitted by the visible light communication of the LED 82.

Figure 5:
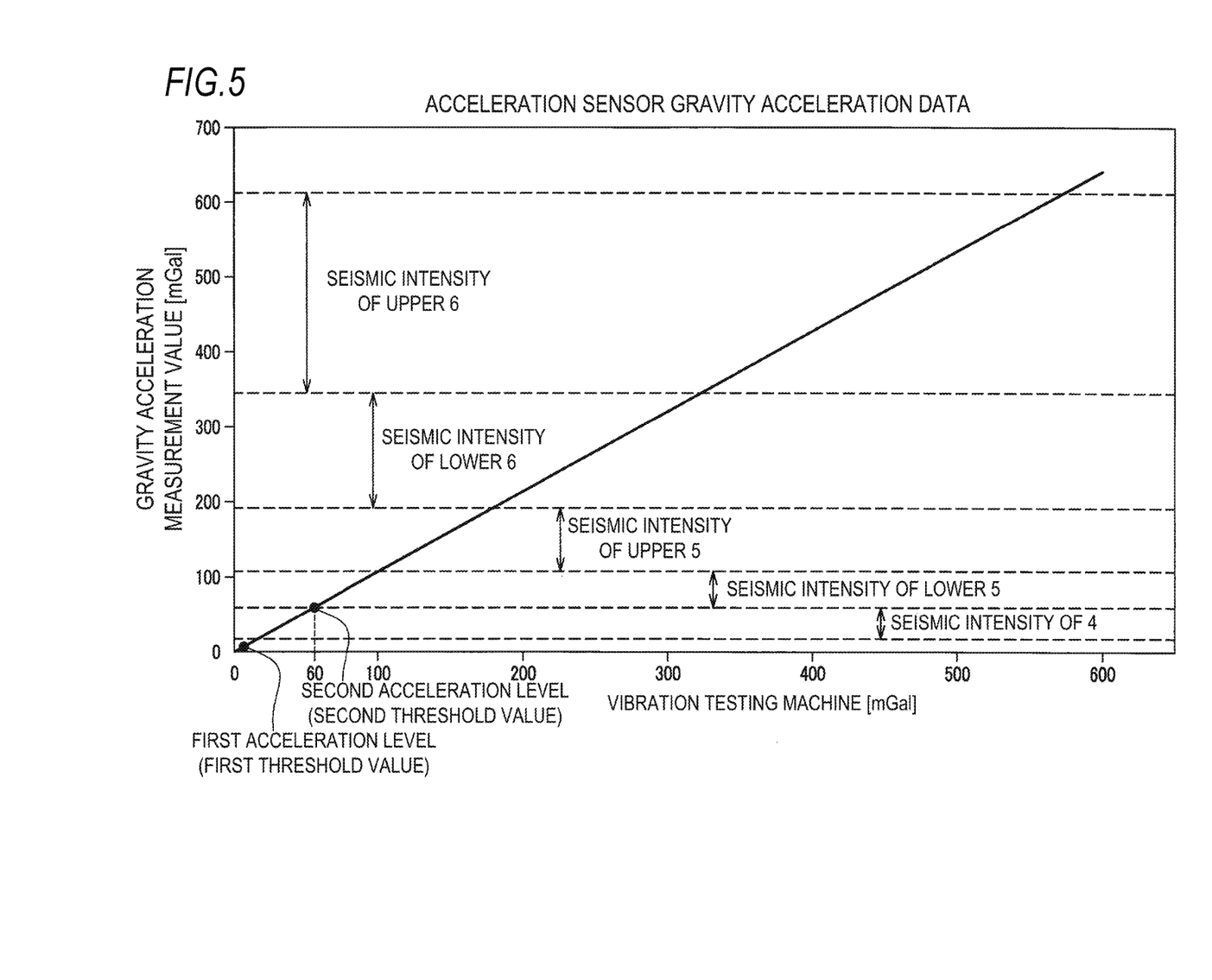
FIG. 5 is a diagram illustrating correspondence between a detection value of an acceleration sensor and a gravity acceleration measurement value due to earthquake.

Next, a second acceleration level is called a second threshold value (a threshold value for data-storing) to be compared with an acceleration sensor value in the state where the acceleration is zero. The second acceleration level is a value larger (a stronger vibration value) than the first acceleration level. The second acceleration level, for example, is set as a value corresponding to acceleration when earthquake with a seismic intensity of lower 5 or more has been detected. As illustrated in FIG. 5, in the case of the earthquake with a seismic intensity of lower 5 or more, acceleration of about 60 mGal or more is detected. Thus, the second acceleration level, for example, is set to 50 mGal in consideration of a slight margin, so that it can serve as a trigger for performing a process of detecting the presence or absence of deterioration (for example, looseness and the like of bolts) due to earthquake of a structure (earthquake with a seismic intensity of lower 5 or more having an influence on fatigue deterioration of the structure).

That is, since a period, in which the second acceleration level is exceeded, is a period in which earthquake occurs, sensor information is controlled to be detected by the strain sensor module 50 in the period, so that a result of the detection is accumulated in the memory 22.

As will be described later, the first threshold value and the second threshold value are set in the acceleration sensor 30 as predetermined threshold values to be compared with an acceleration sensor value in the state where the acceleration is zero.

The acceleration sensor 30 operates in the wake-up mode of outputting the fact that acceleration level being equal to or more than a predetermined threshold value has been detected, while consuming excessively low power. Specifically, in the case in which the first acceleration level has been set in the acceleration sensor 30, when acceleration level being equal to or more than the first acceleration level has been detected, the acceleration sensor 30 outputs a first activation signal (S1-1: a microcomputer activation signal) for activating the microcomputer 21 to the control unit 20.

Furthermore, in the case in which the second acceleration level has been set in the acceleration sensor 30, when acceleration level being equal to or more than the second acceleration level has been detected, the acceleration sensor 30 outputs a first activation signal (S1-2: a detection start trigger signal) for activating the sensor amplifier 52 and the like to the control unit 20. In FIG. 1, the activation signals S1-1 and S1-2 outputted from the acceleration sensor 30 to the control unit 20 are collectively referred to as a first activation signal S1.

The control unit 20 includes the microcomputer 21 and the memory 22, and for example, is configured by an LSI (Large Scale Integration). The configuration of the control unit is not limited thereto, and the control unit may have a configuration in which the memory is included in the microcomputer.

The control unit 20 is in a sleep state in an ordinary state, outputs a detection acceleration setting signal Sa to the acceleration sensor 30, and sets the first acceleration level in the acceleration sensor 30. When the first activation signal (S1-1: the microcomputer activation signal) indicating the detection of acceleration level being equal to or more than the first acceleration level is received from the acceleration sensor 30, the control unit 20 outputs the detection acceleration setting signal Sa to the acceleration sensor 30 and sets the second acceleration level in the acceleration sensor 30.

In a process after the first activation signal (S1-1: the microcomputer activation signal) is received from the acceleration sensor 30, when the first activation signal (S1-2: the detection start trigger signal) is received from the acceleration sensor 30 or when the interrupt signal based on a real-time clock has been generated, the control unit 20 outputs a second activation signal S2 to the DC/DC converter 40 and starts the operation of the DC/DC converter 40. The second activation signal S2 indicates a signal that is outputted by the microcomputer 21 of the control unit 20 in order to activate the DC/DC converter 40.

When the first activation signal (S1-2: the detection start trigger signal) indicating the detection of acceleration level being equal to or more than the second acceleration level has been received from the acceleration sensor 30 or when the interrupt signal based on a real-time clock has been generated, the control unit 20 controls the reading of sensor information of the sensor amplifier 52 and accumulates (stores) the sensor information in the memory 22 (a data detection process).

On the other hand, when the first activation signal (S1-2: the detection start trigger signal) indicating the detection of the acceleration level being equal to or more than the second acceleration level has not been received, the control unit 20 outputs the second activation signal S2 to the DC/DC converter 40 to start the operation of the DC/DC converter 40, activates the LED driver 81, and then transmits accumulated sensor information (also including address information, time information and the like) by the LED 82 via the LED driver 81 (the accumulated data transmission process). That is, the LED driver 81 drives the LED 82 so as to emit light, on which an optical communication signal S4 indicating the sensor information is imposed, and the LED 82 emits the light, on which the optical communication signal S4 is superimposed, so that the sensor information accumulated in the memory 22 is transmitted to an exterior.

Moreover, when a value of the accumulated sensor information exceeds a predetermined threshold value (a predetermined value for determining that it is necessary to issue alarm information), the control unit 20 may output a lighting signal (an example of a control signal) S3 to the LED driver 81 and allow the LED driver 81 to turn on/off the LED 82 (emit an alarm pattern). In this way, it is possible to notify a manager and the like that the value of the sensor information reaches an abnormal level.

The DC/DC converter 40 is connected to the primary battery 10, is activated by the second activation signal S2 from the control unit 20, supplies a voltage (the power supply voltage V2) to the sensor amplifier 52 via the switch 71, and supplies the voltage (the power supply voltage V2) to the control unit 20 and the LED driver 81.

The battery voltage V1 of the primary battery 10 and the power supply voltage V2 outputted from the DC/DC converter 40 are supplied to the control unit 20 via the diode OR circuit 90.

That is, until the DC/DC converter 40 is activated by the second activation signal S2, the battery voltage V1 of the primary battery 10 is supplied to the control unit 20, and at the time at which the DC/DC converter 40 is activated, the power supply voltage V2 is supplied to the control unit 20 in order to match an output voltage and a voltage level of the sensor amplifier 52 with each other.

The switch 71 receives an operation instruction signal C1 from the control unit 20, and supplies the output voltage (the power supply voltage V2) of the DC/DC converter 40 to the sensor amplifier 52.

The strain sensor module 50 includes the strain sensor 51 and a structure in which the strain sensor 51 is mounted. The sensor amplifier 52 receives a voltage via the switch 71, thereby amplifying a detection value D0 by the strain sensor 51 and outputting detection data (sensor information; D1) to the control unit 20.

The LED driver 81 converts the detection date D1, the address information, the time information, and the like accumulated in the memory 22 into the optical communication signal S4 under the control of the control unit 20, superimposes the optical communication signal S4 on light, and transmits the light to an exterior by the LED 82 (visible light communication).

<Operation of Sensor Information Collecting Apparatus>

Next, the operation of the sensor information collecting apparatus 1 will be described (appropriately see FIG. 1).

Figure 3:
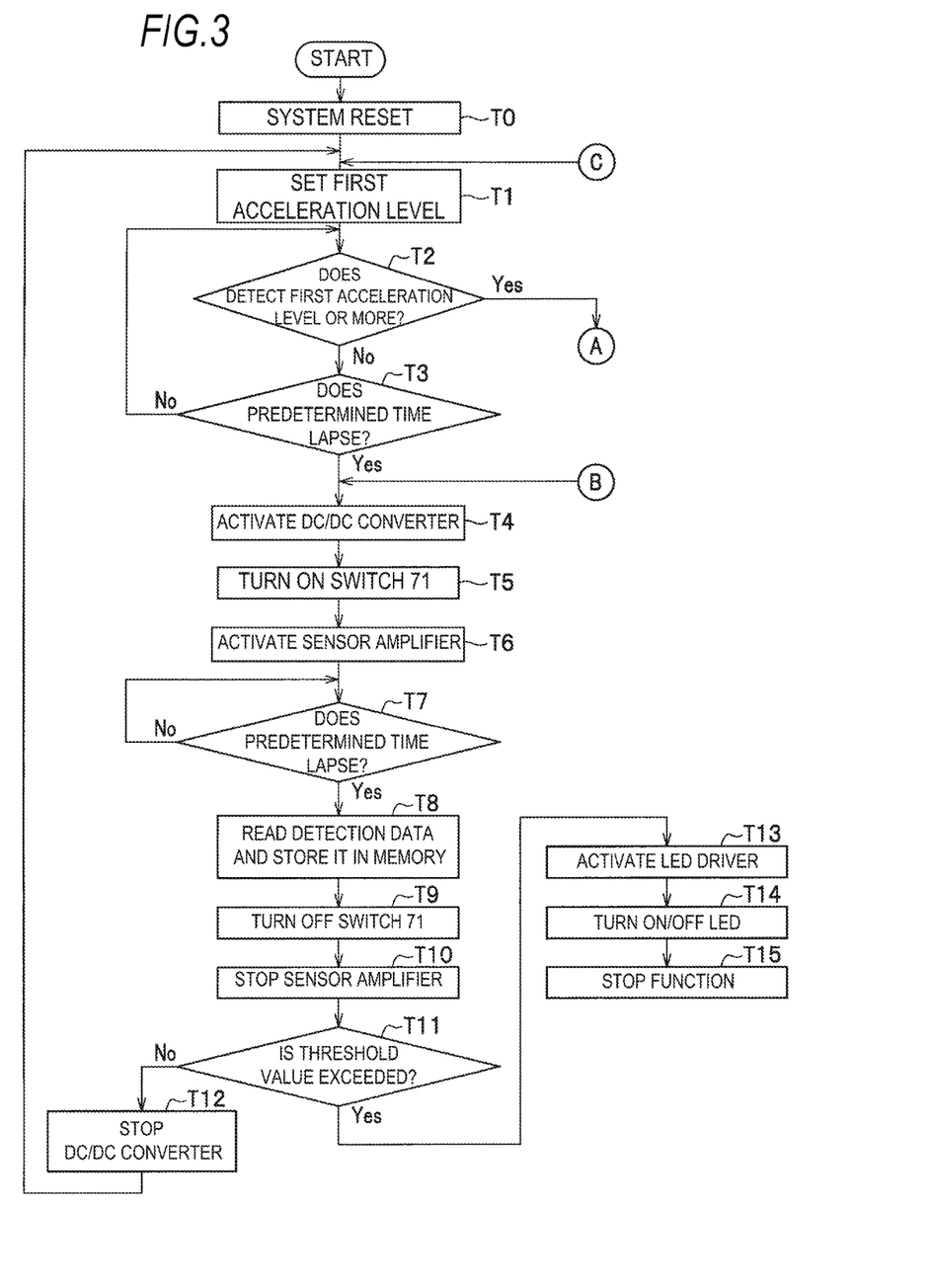
FIG. 3 is a flowchart illustrating a processing flow of the sensor information collecting apparatus according to the embodiment.
Figure 4:
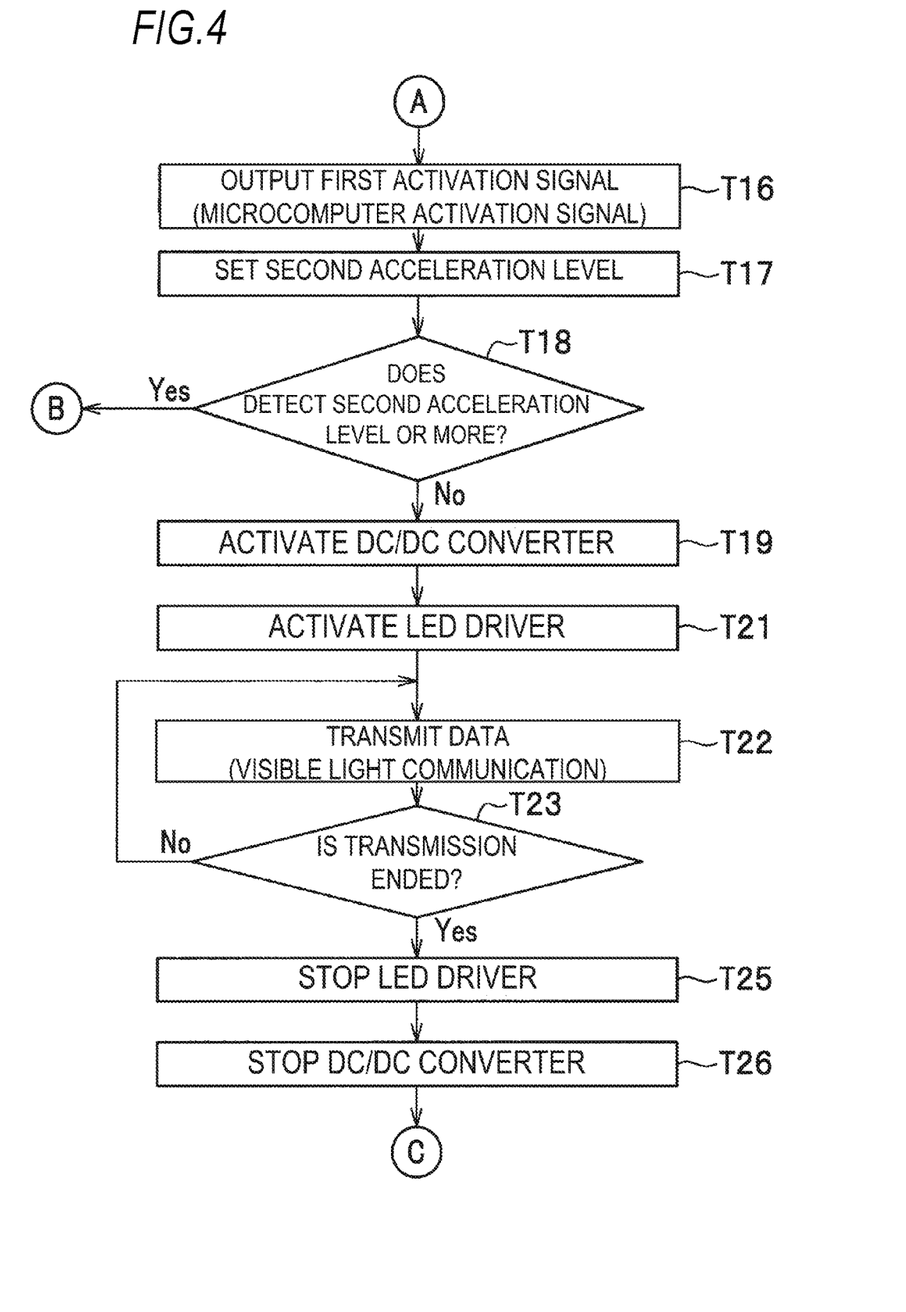
FIG. 4 is a flowchart illustrating a processing flow of the sensor information collecting apparatus according to the embodiment.

FIG. 3 and FIG. 4 are flowcharts illustrating processing flows of the sensor information collecting apparatus 1 according to the present embodiment.

First, upon the operation of the sensor information collecting apparatus 1, system reset is performed as a setting state (an initial state) in an ordinary state (step T0 of FIG. 3).

In this system reset, as a state in the ordinary state of the sensor information collecting apparatus 1, the control unit 20 becomes the sleep state and the acceleration sensor 30 becomes the wake-up mode. The other elements (the DC/DC converter 40, the sensor amplifier 52, the LED driver 81 and the like) enter the operation stop state.

In step T0, in order to notify a worker that the sensor information collecting apparatus 1 normally operates, the LED 82 may be turned on/off by the predetermined number of times.

Subsequently, the microcomputer 21 of the control unit 20 sets the first acceleration level in the acceleration sensor 30 (step T1).

Next, the microcomputer 21 of the control unit 20 determines whether the acceleration sensor 30 operating in the wake-up mode has detected an acceleration level being equal to or more than the first acceleration level (step T2). When the acceleration sensor 30 has detected the acceleration level being equal to or more than the first acceleration level (Yes in step T2), the process proceeds to step T16 of FIG. 4. However, when the acceleration sensor 30 has not detected the acceleration level being equal to or more than the first acceleration level (No in step T2), the process proceeds to next step T3.

In step T3, the microcomputer 21 of the control unit 20 determines whether a predetermined time (for example, 24 hours: a detection cycle of the strain sensor 51) has lapsed. The control unit 20, for example, can determine whether the predetermined time has lapsed according to whether the interrupt signal based on a real-time clock embedded in the microcomputer 21 has been received. In this determination, when the predetermined time has not lapsed (No in step T3), the process returns to step T2. However, when the predetermined time has lapsed (Yes in step T3), the control unit 20 activates from the sleep state, and the process proceeds to next step T4.

Subsequently, the microcomputer 21 outputs the second activation signal S2 to the DC/DC converter 40, thereby activating the DC/DC converter 40 (step T4).

Then, the microcomputer 21 outputs the operation instruction signal C1 to the switch 71, thereby turning on the switch 71 (step T5), and supplies the sensor amplifier 52 with the output voltage (the power supply voltage V2) of the DC/DC converter 40, thereby activating the sensor amplifier 52 (step T6).

Next, the microcomputer 21 determines whether a predetermined time (for example, five seconds: a measurement time by the strain sensor 51) has lapsed after the sensor amplifier 52 is activated (step T7). When the microcomputer 21 determines that the predetermined time has not lapsed (No in step T7), the process waits until the predetermined time lapses. However, when the microcomputer 21 determines that the predetermined time has lapsed (Yes in step T7), the process proceeds to next step T8.

In step T8, the microcomputer 21 reads the detection data D1 obtained by amplifying the detection value (time-dependent fatigue deterioration data D0) of the strain sensor 51 by the sensor amplifier 52, and the memory 22 stores the detection data D1 as accumulated data. The accumulated data to be stored may be stored together with additional information such as a reading time from the strain sensor 51, in addition to the detection data D1.

Subsequently, the microcomputer 21 stops the output of the operation instruction signal C1 to the switch 71 so as to turn off the switch 71 (step T9), and stops the startup of the sensor amplifier 52 (step T10).

Then, the microcomputer 21 determines whether a predetermined threshold value (a value requiring an alarm) is exceeded with reference to the detection data D1 stored in the memory 22 (step T11). When it is determined that the predetermined threshold value is not exceeded (No in step T11), the microcomputer 21 stops the startup of the DC/DC converter 40 (step T12), and the process proceeds to the state in the ordinary state and returns to step T1. However, when it is determined that the predetermined threshold value is exceeded (Yes in step T11), the process proceeds to next step T13.

In step T13, the microcomputer 21 outputs the lighting signal S3 (for example, a pulse signal) to the LED driver 81, thereby activating the LED driver 81. Then, the microcomputer 21 controls the LED 82 to be turned on/off by the control of the LED driver 81 until the power of the primary battery 10 is consumed (an alarm pattern is emitted) (step T14), and finally stops the functions of the entire sensor information collecting apparatus 1 and ends the procedure (step T15).

The turning on/off of T14 does not correspond to a visible light communication pattern for machine use, and corresponds to a pattern for conforming an alarm through visual observation for human use (capable of visually determining an alarm state). That is, the light emission of the LED 82 corresponds to a configuration in which two functions for machine use (step T22 to be described later) and human use (step T14) are performed by one part.

In step T2, when the acceleration sensor 30 has detected the acceleration level being equal to or more than the first acceleration level (Yes in step T2), the process proceeds to step T16 of FIG. 4.

In step T16, the acceleration sensor 30 outputs, to the control unit 20, the first activation signal (S1-1: the microcomputer activation signal) indicating the detection of the acceleration level being equal to or more than the first acceleration level.

When the first activation signal (S1-1: the microcomputer activation signal) is received, the microcomputer 21 outputs the detection acceleration setting signal Sa for setting the second acceleration level to the acceleration sensor 30, and sets the second acceleration level in the acceleration sensor 30 (step T17).

The microcomputer 21 determines whether the acceleration sensor 30 has detected acceleration level being equal to or more than the second acceleration level in a predetermined time (for example, three minutes: a time for detecting earthquake and the like) (step T18). When the acceleration level being equal to or more than the second acceleration level has been detected (Yes in step T18), the acceleration sensor 30 outputs, to the control unit 20, the first activation signal (S1-2: the detection start trigger signal) for activating the sensor amplifier 52 and the like.

Then, the process proceeds to step T4 of FIG. 3, and the microcomputer 21 performs processes of outputting the second activation signal S2 to the DC/DC converter 40 so that the DC/DC converter 40 is activated, storing the detection data D1 obtained by amplifying the detection value of the strain sensor 51 by the sensor amplifier 52 in the memory 22, and the like (the data detection process) (steps T4 to T15).

Returning to FIG. 4, in step T18, when the acceleration sensor 30 has not detected the acceleration level being equal to or more than the second acceleration level in the predetermined time (No in step T18), that is, when the microcomputer 21 has not received the first activation signal (S1-2: the detection start trigger signal) in the predetermined time, the process proceeds to next step T19.

In step T19, the microcomputer 21 outputs the second activation signal S2 to the DC/DC converter 40, thereby activating the DC/DC converter 40.

Then, the microcomputer 21 activates the LED driver 81 for the purpose of visible light communication (step T21).

Subsequently, the microcomputer 21 employs the accumulated data, such as the detection data D1 stored in the memory 22, as the optical communication signal S4, and the LED 82 superimposes the optical communication signal S4 on light via the LED driver 81 and transmits the light (visible light communication) (step T22). That is, in step T22, the LED 82 follows a lighting pattern for transmitting data content.

Then, the microcomputer 21 determines whether the transmission of the accumulated data such as the detection data D1 stored in the memory 22 has been ended (step T23). When the transmission has not been ended (No in step T23), the process returns to step T22 and the transmission is continued.

However, when the transmission has been ended (Yes in step T23), the microcomputer 21 stops the operation of the LED driver 81 (step T25). Then, the microcomputer 21 stops the operation of the DC/DC converter 40 (step T26), and the process proceeds to the state in the ordinary state and returns to step T1.

The sensor information collecting apparatus 1 may perform the turning on/off of the LED 82 by the LED driver 81 of steps T13 to T15, convert the accumulated data including the detection data D1 exceeding a predetermined threshold value (a predetermined value requiring an alarm) determined in step T11 into the optical communication signal S4, superimpose the optical communication signal S4 on light of the LED 82, and transmit the light to an exterior (visible light communication).

That is, an optical communication signal may be superimposed on light of an alarm pattern.

In addition, accumulated data to be superimposed on the light of the alarm pattern may include past detection data D1 as well as the detection data D1 exceeding the predetermined value requiring an alarm, or the past detection data D1 may be data not exceeding the predetermined value.

As described above, in accordance with the sensor information collecting apparatus 1 according to the present embodiment, the apparatus can be installed in a place with no power supply infrastructure and reduces the power consumption of the primary battery 10, so that it is possible to prevent the lifetime of the primary battery 10 from being impaired. Furthermore, the LED driver 81 is activated only when communication is required (steps T21 to T25 of FIG. 4), so that a battery saving effect is further obtained.

Moreover, by a configuration in which data of the strain sensor 51 is transmitted by visible light communication from the LED 82 controlled by the LED driver 81, the sensor information collecting apparatus 1 does not prepare another communication unit such as a wireless module, so that it is possible to achieve device simplification and cost reduction. In the visible light communication, since interference is small as compared with a radio wave system, reliability of data transmission is high and a high security effect is obtained. Furthermore, in the case of the wireless module, there is a place where radio waves are not used due to an influence and the like to a machine, but in the case of optical communication, an application place is wide because such a limitation is small.

Based on a command (a visible light communication ID standard) from the microcomputer 21, the LED driver 81 converts the accumulated data into an optical communication signal, superimposes the optical communication signal on light, and transmits the light by using the high speed response of the LED 82. In this way, modulation of data to light is facilitated and demodulation of data reading from light is facilitated (hardware is simple and cost is low).

Furthermore, acceleration level being equal to or more than the first acceleration level is controlled to be detected by the acceleration sensor 30 by using a hammer and the like, so that it is possible to activate the LED driver 81. Thus, extraction of data accumulated in the sensor information collecting apparatus 1 can be simply performed in optical communication. That is, a worker can simply read (collect) accumulated data (sensor information) without requiring an advanced technology (complicated setting and operation). At this time, the worker has an apparatus that receives the accumulated data (the sensor information) transmitted in optical communication, or installs (and the like) the apparatus on the ground, so that one worker can read (collect) the accumulated data (the sensor information). Furthermore, since it is sufficient if the worker hits (and the like) the sensor information collecting apparatus 1, it is possible to collect data without impairing dustproof and waterproof countermeasures of the sensor information collecting apparatus 1.

This disclosure is not limited to the aforementioned embodiment, and modification examples can be made without departing the scope of this disclosure.

For example, the present embodiment has described that a worker hits the sensor information collecting apparatus 1 by using a hammer and the like (an example of collision from an exterior), so that the acceleration sensor 30 outputs the first activation signal S1; however, this disclosure is not limited to the hammer. If the sensor information collecting apparatus 1 is installed in a high place, a worker may cause vibration by using a rod and the like. Furthermore, when the sensor information collecting apparatus 1 is installed in a place where no worker exits around, a robot, instead of the worker, may cause vibration in the sensor information collecting apparatus 1 such that the first acceleration level or more is obtained.

Furthermore, the present embodiment has described that the acceleration sensor 30 is embedded in the casing 5 (see FIG. 2) of the sensor information collecting apparatus 1. However, the acceleration sensor 30 may be installed outside the casing 5, and for example, the acceleration sensor 30 may be mounted in a structure in which one side has a metal rod shape and may be configured to be easily able to detect vibration (acceleration). Furthermore, when the sensor information collecting apparatus 1 itself is installed in an infrastructure, an elastic body is arranged therebetween, so that vibration (acceleration) may be set to be easily detected by the acceleration sensor 30. In this way, it is possible to easily detect the first acceleration level. For example, a worker shakes the sensor information collecting apparatus 1 with his/her hands, and thus the sensor information collecting apparatus 1 can be started.

Moreover, a description will be provided for configurations in which this disclosure is not limited to the contents described in the aforementioned embodiment.

(1) A battery provided in the sensor information collecting apparatus 1 is not limited to the primary battery 10, and a secondary battery and the like may be used.

(2) The circuit configuration illustrated in the functional block diagram of the sensor information collecting apparatus 1 of FIG. 1 is an example of this disclosure, and this disclosure is not limited thereto. For example, an illumination unit is not limited to the LED 82 and a fluorescent lamp and the like may be used. Furthermore, the configuration of the control unit 20 is not limited to the present embodiment, and the control unit 20 may have a configuration in which the memory 22 is included in the microcomputer 21.

(3) The processing flows (the flowcharts) of the sensor information collecting apparatus 1 illustrated in FIG. 3 and FIG. 4 are an example of this disclosure, and this disclosure is not limited thereto. For example, another process may be performed among the steps.

(4) The correspondence between the detection value of the acceleration sensor and the gravity acceleration measurement value due to earthquake illustrated in FIG. 5 is one of a specific example, and this disclosure is not limited thereto.

(5) In the present embodiment, the detection data D1 and the like stored in the memory 22 by collision (for example, hitting by a hammer and the like) from an exterior may be configured to be converted into the optical communication signal S4, and to be transmitted by the LED 82 via the LED driver 81. However, this disclosure is not limited thereto, and for example, as well as the detection data D1 stored in the memory at the time point at which collision has been received from an exterior, when the collision has been received from the exterior, the strain sensor 51 may read a new detection value, put the new detection data into the detection data D1 stored in the memory 22 before the reading, and convert the detection data D1 into the optical communication signal S4, and allow the optical communication signal S4 to be transmitted by the LED 82 via the LED driver 81.

What is claimed is:

1. A sensor information collecting apparatus comprising:
   a sensor module including a sensor;
   a sensor amplifier, which is in an operation stop state in an ordinary state, is activated in response to receiving a power supply voltage, and outputs detection data detected by the sensor as sensor information;
   an acceleration sensor, which detects an acceleration level being equal to or more than a predetermined threshold value;
   a control unit, which manages the detection data in a memory;
   a power supply unit, which is in the operation stop state in the ordinary state and supplies the power supply voltage to the sensor amplifier in response to an instruction from the control unit;
   an illumination unit, which is able to emit light with superimposing an optical communication signal;
   an illumination driver, which is in the operation stop state in the ordinary state and controls the illumination unit; and
   a battery, which supplies a battery voltage to the acceleration sensor, the control unit, and the power supply unit,
   wherein, when the acceleration sensor detects an acceleration level being equal to or more than a threshold value for data-storing set as a predetermined threshold value, the control unit activates the sensor amplifier and controls the memory to store the detection data outputted from the sensor amplifier, and
   wherein, when the acceleration sensor detects an acceleration level which is less than the threshold value for data-storing and is equal to or more than a threshold value for data-transmitting, which is smaller than the threshold value for data-storing, set as a predetermined threshold value, the control unit activates the illumination driver, reads the detection data stored in the memory, and outputs the optical communication signal indicating the detection data to the illumination driver, so that the illumination driver controls the illumination unit to emit light, on which the optical communication signal is superimposed.

2. The sensor information collecting apparatus according to claim 1,
   wherein when a value of the detection data stored in the memory exceeds a predetermined value, the control unit activates the illumination driver, and controls the illumination driver to convert accumulated data including the detection data into the optical communication signal, and the illumination driver controls the illumination unit to emit the light, on which the optical communication signal is superimposed.

3. The sensor information collecting apparatus according to claim 1,
   wherein the illumination unit is able to emit an alarm pattern, which is visually distinguishable by eye, and
   wherein when a value of the detection data stored in the memory exceeds a predetermined value, the control unit activates the illumination driver, and the illumination driver controls the illumination unit to emit the alarm pattern.

4. The sensor information collecting apparatus according to claim 3, wherein the illumination driver superimposes the optical communication signal indicating the detection data on the alarm pattern and controls the illumination unit to emit the alarm pattern.

5. The sensor information collecting apparatus according to claim 1,
wherein the sensor module includes a strain sensor that detects a strain as a measurement target and generates the detection data.

6. The sensor information collecting apparatus according to claim 1,
wherein, in addition to a case in which the acceleration sensor detects the acceleration level being equal to or more than the threshold value for data-storing, the control unit uses a case, in which an interrupt signal based on a real-time clock is generated, as a trigger for controlling the memory to store the detection data.

\* \* \* \* \*